Sept. 20, 1966 WOLF-DIETER BENSINGER ETAL 3,273,544
ROTARY PISTON INTERNAL COMBUSTION ENGINE
Filed March 20, 1964
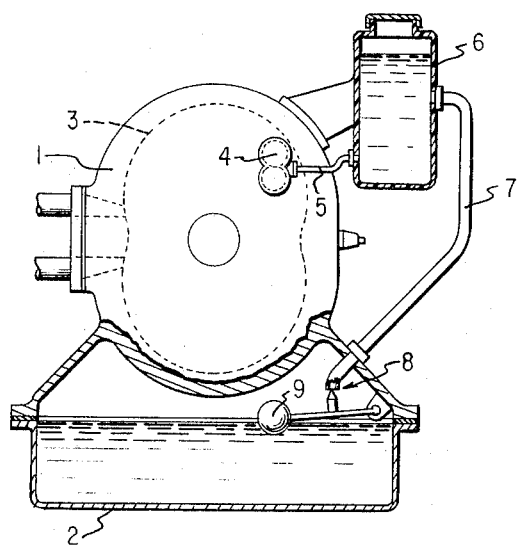
INVENTORS.
WOLF-DIETER BENSINGER
HANS-OTTO DERNDINGER
FRANZ G. F. BEHLES
BY Dicke & Craig
ATTORNEYS.

3,273,544
ROTARY PISTON INTERNAL COMBUSTION ENGINE
Wolf-Dieter Bensinger, Stuttgart-Unterturkheim, Hans-Otto Derndinger, Stuttgart-Wangen, and Franz G. F. Behles, Ingolstadt, Germany, assignors to Daimler-Benz Aktiengesellschaft, Stuttgart-Unterturkheim, Germany
Filed Mar. 20, 1964, Ser. No. 353,387
Claims priority, application Germany, Mar. 23, 1963, D 41,204
14 Claims. (Cl. 123—8)

The present invention relates to a rotary piston internal combustion engine of trochoidal construction which is provided with an oil pan or oil sump flangedly connected to the bottom of the engine housing.

Internal combustion engines of this type require, for the lubrication of the drive unit and for the lubrication of the inner cam surfaces serving as cam track for the piston, separate lubricating pumps. Since it is disadvantageous, however, for the lubrication of the internal cam surfaces to utilize oil from the oil sump, which is utilized therefrom for the lubrication of the drive unit, as the use of oil which is as cool and free of air as possible is necessary for the lubrication of the inner cam surfaces, and since furthermore the oil pan underneath the internal combustion engine has to be kept as small as possible for spatial reasons so that the oil sump or pan cannot be subdivided into two tanks or reservoirs, the present invention provides an additional relatively high oil storage tank or reservoir which, on the one hand, is in communication by way of a line having a regulatable flow cross section with the oil sump and, on the other, by way of a line with an oil pump supplying oil from the oil storage tank or reservoir to the internal cam surfaces of the engine. The lubricating oil for the supply of the drive unit is taken, as ususal, with the arrangement of the present invention from the oil sump into which returns the unused oil, whereas lubricating oil for the supply of the inner cam surfaces is taken from the additional oil storage tank or reservoir which is arranged separate from the oil sump at a relatively high place at the engine or in the engine space of the vehicle and by reason of the separation from the oil sump holds cool oil in reserve that is free of air. Therebeyond, the additional oil reservoir or tank serves as oil storage reservoir for the lubricating oil in the oil sump in such a manner that lubricating oil used up out of the oil sump is replaced by lubricating oil from the additional oil storage tank. The oil pan itself, can therefore, be kept desirably small. The arrangement of an oil-measuring stick is, therefore, not necessary as the oil level can be directly seen in the relatively high auxiliary oil storage tank or reservoir.

According to a further feature and development of the present invention, the flow cross section of the line leading from the auxiliary oil storage tank or reservoir to the oil sump may be controlled by a float valve in dependence on the oil level in the oil sump. Furthermore, the discharge cross section of the line leading to the oil sump may be disposed at a higher level in the additional oil storage reservoir or tank than the discharge cross section of the line leading to the oil pump. Moreover, the additional oil storage tank or reservoir may consist of a transparent material so that one is able to see the level of the oil supply at all times.

Accordingly, it is an object of the present invention to provide a lubricating system for rotary piston internal combustion engines, particularly those of trochoidal construction, which avoids by simple means, the drawbacks and shortcomings encountered with the prior art constructions.

It is another object of the present invention to provide a rotary piston internal combustion engine of trochoidal construction having a lubricating system which, not withstanding the small dimensions of the oil sump, permits the supply of lubricating oil to the internal cam surfaces of the engine that is as cool and as free from air as possible.

A still further object of the present invention resides in the provision of a lubricating system for rotary piston internal combustion engines of trochoidal construction which, by simple means, permits a complete separation of the lubricating system for the drive unit and the lubricating system for the internal cam surfaces, yet does not entail costly installations and large number of additional parts.

Still a further object of the present invention resides in the provision of a lubricating system for a rotary piston internal combustion engine of trochoidal construction in which the lubricating system of the drive unit is replenished, in case of loss of lubricant, by the lubricating system for the internal cam surfaces without involving intermixing of the lubricant of the former system with the lubricant of the latter system.

Another object of the present invention resides in the provision of a lubricating system for rotary piston internal combustion engines of the type described hereinabove which simplifies the control of the amount of lubricant present within the system.

A further object of the present invention resides in the provision of a lubricating system for an internal combustion engine of the type described which obviates the need for a measuring stick to determine the amount of lubricating oil present in the system.

These and other objects, features, and advantages of the present invention will become more obvious from the following description when taken in connection with the accompanying drawing which shows, for purposes of illustration only, in the single figure thereof, one embodiment of a lubricating system for a rotary piston internal combustion engine of trochoidal construction in accordance with the present invention.

Referring now to the single figure of the drawing, which shows schematically in partial cross section a rotary piston internal combustion negine provided with a lubricating system in accordance with the present invention, reference numeral 1 designates therein the housing of a rotary piston internal combustion engine of trochoidal construction which may be of any conventional construction. The oil pan containing the oil sump 2 is flangedly connected from below to the housing 1. The lubricating oil for the lubrication of the drive unit of the engine is contained within the sump 2. This lubricating oil is supplied in the usual manner by means of a conventional oil pump (not shown) to the individual load and receiving places of the engine to be lubricated. The unused lubricating oil again flows back to the oil sump 2 in the usual manner. The oil pump 4 is provided for the supply of the inner cam surfaces 3 serving as cam track for the piston of the engine 1. The oil pump 4 removes cool lubricating oil free of air by way of line 5 from the additional oil storage tank or reservoir 6 which is secured at the housing 1 of the engine at a relatively high place and which consists of a transparent plastic material so that the oil supply or the condition of the oil level therein can be observed at all times. Whereas the line 5 leading to the oil pump 4 leads away from the oil storage tank or reservoir 6 near the bottom thereof, the line 7 which leads back to the oil sump 2 is flangedly connected at the oil storage tank 6 above the line 5. The discharge of the line 7 into the oil sump 2 is controlled by a valve 8 which opens or closes the discharge orifice by means of float 9 in dependence on the oil level within the oil sump 2. With a small supply of oil in the oil sump 2, the valve 8 opens whereas with a larger supply of oil in sump 2, the valve 8 closes.

If one fills oil into the additional oil storage tank or reservoir 6, then the oil sump 2 is also filled by way of line 7, and more particularly for such length of time until the valve 8 closes the flow cross section of the line 7. In operation, the oil level within the oil sump 2 will now decrease slowly. When the oil level in the additional oil storage tank 6 falls below the inlet cross section of the line 7, no oil reaches any longer the oil sump 2 from the tank 6. When the oil storage tank 6 is nearly empty, the oil level in the oil sump 2, however has not yet dropped below the necessary amount. One now fills the additional oil storage tank 6 with oil for such length of time until an oil level is reached therein above the inlet cross section of the line 7, in which case the oil sump 2 is again filled to such an extent that the valve 8 closes. An oil level control is only necessary for the additional oil storage reservoir or tank 6 which is made of transparent material. The usual oil-measuring stick may therefore be dispensed with by the present invention.

Consequently, one no longer needs to worry about the oil level in the oil sump 2, and it is additionally achieved by the present invention that the oil for the lubrication of the inner surface 3 is always free of air and fresh. In order to attain very long periods for the refill of oil, it is appropriate to make the additional oil storage tank or reservoir 6 above the line 7 sufficiently large so that oil is available for the flow thereof into the oil sump 2 after opening of the valve 8.

While we have shown and described one embodiment in accordance with the present invention, it is understood that the same is not limited thereto but is susceptible of numerous changes and modifications as known to a person skilled in the art, and we therefore do not wish to be limited to these details shown and described herein but intend to cover all such changes and modifications as are encompassed by the scope of the appended claims.

We claim:

1. A rotary piston internal combustion engine of trochoidal construction having a housing provided with internal cam surfaces and an oil pan forming the oil sump and flangedly connected below the housing, comprising:
   additional oil storage tank means disposed relatively high,
   first line means operatively connecting said additional tank means with the oil sump,
   and second line means including oil pump means connecting said additional tank means with the engine to supply lubricating oil from said additional tank means to the internal cam surfaces of the engine.

2. A rotary piston internal combustion engine of trochoidal construction having a housing provided with internal cam surfaces and an oil pan forming the oil sump and flangedly connected below the housing, comprising:
   additional oil storage tank means disposed relatively high,
   first line means operatively connecting said additional tank means with the oil sump,
   and second line means including oil pump means connecting said additional tank means with the engine to supply lubricating oil from said additional tank means to the internal cam surfaces of the engine,
   said first line means including float valve means for controlling the flow cross section thereof in dependence on the oil level within the oil sump.

3. A rotary piston internal combustion engine of trochoidal construction having a housing provided with internal cam surfaces and an oil pan forming the oil sump and flangedly connected below the housing, comprising:
   additional oil storage tank means disposed relatively high,
   first line means operatively connecting said additional tank means with the oil sump,
   and second line means including oil pump means connecting said additional tank means with the engine to supply lubricating oil from said additional tank means to the internal cam surfaces of the engine,
   the outflow cross section of said first line means being arranged at said additional tank means higher than the outflow cross section of said second line means.

4. A rotary piston internal combustion engine of trochiodal construction having a housing provided with internal cam surfaces and an oil pan forming the oil sump and flangedly connected below the housing, comprising:
   additional oil storage tank means disposed relatively high,
   first line means operatively connecting said additional tank means with the oil sump,
   and second line means including oil pump means connecting said additional tank means with the engine to supply lubricating oil from said additional tank means to the internal cam surfaces of the engine,
   and said additional tank means being made of transparent material.

5. A rotary piston internal combustion engine of trochoidal construction having a housing provided with internal cam surfaces and an oil pan forming the oil sump and flangedly connected below the housing, comprising:
   additional oil storage tank means disposed relatively high,
   first line means operatively connecting said additional tank means with the oil sump,
   and second means including oil pump means connecting said additional tank means with the engnie to supply lubricating oil from said additional tank means to the internal cam surfaces of the engine,
   said first line means including float valve means for controlling the flow cross section thereof in dependence on the oil level within the oil sump,
   the outflow cross section of said first line means being arranged at said additional tank means higher than the outflow cross section of said second line means.

6. A rotary piston internal combustion engine of trochoidal construction having a housing provided with internal cam surfaces and an oil pan forming the oil sump and flangedly connected below the housing, comprising:
   additional oil storage tank means disposed relatively high,
   first line means operatively connecting said additional tank means with the oil sump,
   and second line means including oil pump means connecting said additional tank means with the engine to supply lubricating oil from said additional tank means to the internal cam surfaces of the engine,
   said first line means including float valve means for controlling the flow cross section thereof in dependence on the oil level within the oil sump,
   the outflow cross section of said first line means being arranged at said additional tank means higher than the outflow cross section of said second line means, and said additional tank means being made of transparent material.

7. A rotary piston internal combustion engine of trochoidal construction having a housing provided with internal cam surfaces and an oil pan forming the oil sump and flangedly connected below the housing, comprising:
additional oil storage tank means disposed relatively high,
first line means operatively connecting said additional tank means with the oil sump,
and second line means including oil pump means connecting said additional tank means with the engine to supply lubricating oil from said additional tank means to the internal cam surfaces of the engine,
the outflow cross section of said first line means being arranged at said additional tank means higher than the outflow cross section of said second line means,
and said additional tank means being made of transparent material.

8. A rotary piston internal combustion engine of trochoidal construction having a housing provided with internal cam surfaces and an oil pan forming the oil sump and flangedly connected below the housing, comprising:
additional oil storage tank means disposed relatively high,
first line means operatively connecting said additional tank means with the oil sump,
and second line means including oil pump means connecting said additional tank means with the engine to supply lubricating oil from said additional tank means to the internal cam surfaces of the engine,
said first line means including float valve means for controlling the flow cross section thereof in dependence on the oil level within the oil sump,
and said additional tank means being made of transparent material.

9. A rotary piston internal combustion engine of trochoidal construction, comprising:
housing means provided with internal cam surfaces,
oil sump means connected to said housing means,
additional oil tank means disposed higher than said oil sump means,
means for lubricating the drive unit from said sump means,
first line means operatively connecting said additional tank means with the oil sump means and including means for controlling the flow cross section thereof,
and second line means including oil pump means connecting said additional tank means with the engine to supply lubricating oil from said additional tank means to the internal cam surfaces,
and said additional tank means being made of transparent material.

10. A lubricating system for an internal combustion engine, especially for a rotary piston internal combustion engine of trochoidal construction having an engine housing provided with internal surfaces and a piston rotating with the piston corners along the internal surfaces, comprising:
a first lubricating system including oil sump means arranged near the bottom of the engine housing and oil pump means for lubricating the drive unit of said engine,
a second lubricating system for supplying a lubricant that is as fresh and free of air as possible to said internal surfaces including additional oil tank means located above said oil sump means and line means including further pump means for supplying lubricant from said tank means to said internal surfaces,
and further line means connecting said tank means with said sump means.

11. A lubricating system for an internal combustion engine, especially for a rotary piston internal combustion engine of trochoidal construction having an engine housing provided with internal surfaces and a piston rotating with the piston corners along the internal surfaces, comprising:
a first lubricating system including oil sump means arranged near the bottom of the engine housing and oil pump means for lubricating the drive unit of said engine,
a second lubricating system for supplying a lubricant that is as fresh and free of air as possible to said internal surfaces including susbstantially transparent additional oil tank means located above said oil sump means and line means including further pump means for supplying lubricant from said tank means to said internal surfaces,
and further line means connecting said tank means with said sump means.

12. A lubricating system for an internal combustion engine, especially for a rotary piston internal combustion engine of trochoidal construction having an engine housing provided with internal surfaces and a piston rotating with the piston corners along the internal surfaces, comprising:
a first lubricating system including oil sump means arranged near the bottom of the engine housing and oil pump means for lubricating the drive unit of said engine,
a second lubricating system for supplying a lubricant that is as fresh and free of air as possible to said internal surfaces including substantially transparent additional oil tank means located above said oil sump means and line means including further pump means for supplying lubricant from said tank means to said internal surfaces,
and further line means connecting said tank means with said sump means, said second line means being arranged at said tank means above said first-mentioned line means.

13. A lubricating system for an internal combustion engine, especially for a rotary piston internal combustion engine of trochoidal construction having an engine housing provided with internal surfaces and a piston rotating with the piston corners along the internal surfaces, comprising:
a first lubricating system including oil sump means arranged near the bottom of the engine housing and oil pump means for lubricating the drive unit of said engine,
a second lubricating system for supplying a lubricant that is as fresh and free of air as possible to said internal surfaces including substantially transparent additional oil tank means located above said oil sump means and line means including further pump means for supplying lubricant from said tank means to said internal surfaces,
and further line means connecting said tank means with said sump means, said second line means being arranged at said tank means above said first-mentioned line means and including valve means for controlling the flow cross section of said further line means in dependence on the oil level within the sump means.

14. A lubricating system for an internal combustion engine, especially for a rotary piston internal combustion engine of trochoidal construction having an engine housing provided with internal surfaces and a piston rotating with the piston corners along the internal surfaces, comprising:
a first lubricating system including oil sump means arranged near the bottom of the engine housing and oil pump means for lubricating the drive unit of said engine,
a second lubricating system for supplying a lubricant that is as fresh and free of air as possible to said internal surfaces including additional oil tank means located above said oil sump means and line means including further pump means for supplying lubricant from said tank means to said internal surfaces,
and further line means connecting said tank means with said sump means, said second line means being arranged at said tank means above said first-mentioned line means and including valve means for controlling the flow cross section of said further line means in dependence on the oil level within the sump means.

References Cited by the Examiner
UNITED STATES PATENTS

| | | |
|---|---|---|
| 1,558,788 | 10/1925 | Campbell. |
| 2,956,730 | 10/1960 | Hamilton et al. ____ 230—206 X |
| 3,140,041 | 7/1964 | Kramer et al. _____ 230—206 X |

MARK NEWMAN, *Primary Examiner.*

W. J. KRAUSS, *Assistant Examiner.*